United States Patent Office 2,794,823
Patented June 4, 1957

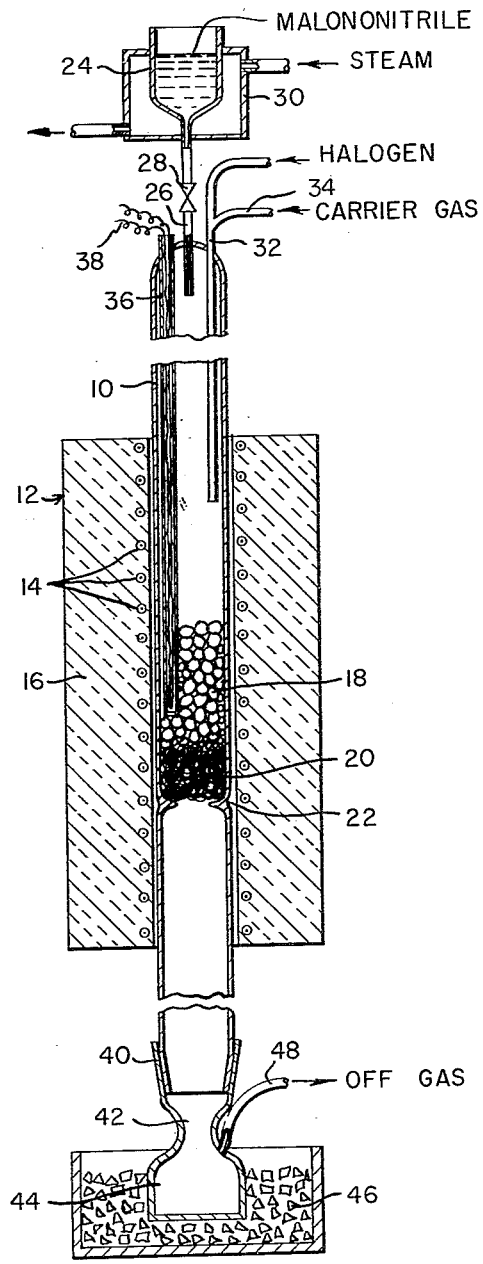

2,794,823

PREPARATION OF TETRACYANOETHYLENE

Richard E. Heckert, Chesterfield County, Va., assignor to E. I. du Pont de Nemours and Company, Wilmington, Del., a corporation of Delaware Application April 5, 1955, Serial No. 499,464

9 Claims. (Cl. 260—465.8)

This invention is concerned with a new process for the preparation of tetracyanoethylene.

The copending application of Cairns and Graef, Serial No. 382,842, filed September 28, 1953, and assigned to the assignee of the present application, discloses and claims a valuable new compound, tetracyanoethylene, and a process for preparing it by reaction of malononitrile with sulfur monochloride. The process is a practical route to tetracyanoethylene when a pure product is not required, but this reaction gives sulfur as a by-product, along with small amounts of tar-like residues. While these can be rigorously separated from tetracyanoethylene, this is not an economically desirable method for preparing tetracyanoethylene in commercial quantities.

It is an object of this invention to provide a new process for preparing tetracyanoethylene. A further object is to provide a more economical process for preparing tetracyanoethylene. Other objects of the invention will become apparent from the specification, the drawing, and the claims.

There has now been discovered a process for the preparation of tetracyanoethylene by reaction in the vapor phase of malononitrile with a halogen of atomic weight above 30 (i. e., chlorine, bromine or iodine). Since malononitrile boils at 220° C., and tetracyanoethylene starts to decompose at temperatures above 500° C., this reaction is preferably carried out at temperatures in the range of about 220–500° C., and temperatures of 250–350° C. are the most desirable when passing the reactants through a continuous reactor at space velocities (throughput in volumes of vapor per hour divided by the volume of reaction zone) of 150–500 per hour.

In the preferred process of this invention, vapors of malononitrile and chlorine are mixed and reacted in a reactor having a packed reaction zone maintained at 250–350° C., using a feed rate which provides a space velocity through the reaction zone in the range of 150–500 per hour. Thereafter, the vapors are cooled to condense the tetracyanoethylene which is formed. The tetracyanoethylene is isolated from by-products and unchanged starting materials by extraction of the condensate and recrystallization of tetracyanoethylene from solution; it may be further purified by sublimation at reduced pressure if desired.

The drawing illustrates a suitable apparatus for continuous operation of the process.

The apparatus comprises a reactor 10, which may be tubular in shape, means for heating the reactor to the required temperature, such as an electric furnace 12, means for introducing the reactants into one end of the reactor, means for passing the reaction mixture out of the other end of the reactor, and means for collecting the tetracyanoethylene product. The drawing shows a laboratory embodiment in which the reactants flow downward through an upright column, the malononitrile being introduced dropwise as a liquid so that the drops vaporize as they fall through the column. The malononitrile can be vaporized before it is introduced, in which case the reactants can be passed in any desired direction through a reactor. Suitable embodiments for industrial applications will be readily apparent to one skilled in the art; these include reaction towers and tube types of reactors.

For laboratory purposes the reactor 10 may be a vertically-mounted, heat-resistant borosilicate glass tube, having an inside diameter to length ratio of 4.5/80. An electric furnace 12 surrounds the tube for a portion of its length to provide a heated reaction zone. This zone should be of sufficient length to complete the reaction at the desired rate of flow, a heated zone of about one-half of the length of the tube being convenient for space velocities of 150–500 per hour. The furnace comprises electric heating coils 14 surrounded by insulation 16. The reaction zone is preferably packed with an inert material such as lumps of calcium oxide 18 or rings of heat-resistant borosilicate glass. The packing may be supported on a plug of glass wool 20 held in position by indentations 22 formed in the tube walls. The use of packing in the heated reaction zone is not essential but is desirable to provide for thorough mixing and uniform heating of the reactants, to improve heat transfer from the tube walls, and to insure complete vaporization of the malononitrile, particularly at high rates of flow. A packed reaction zone, therefore, permits the use of more rapid throughput rates and results in substantial economies in large-scale operation.

The malononitrile is melted in an addition funnel 24, the stem 26 of which is sealed into the top of the reactor. A valve 28 is provided in the stem to control the rate of flow. The funnel is heated by stem in jacket 30 which surrounds the funnel. A halogen inlet tube 32 is also sealed into the top of the reactor. This tube extends into the heated zone of the reactor. An inert carrier gas, e. g., nitrogen, may be employed; it may be introduced into the reaction mixture through a sidearm 34 on the tube 32. A thermocouple well 36, extending to near the center of the reaction zone, is provided to measure the reaction temperature. The thermocouple leads are shown at 38.

The mixed reactant vapors may be passed through the reaction zone maintained at a temperature of 250–500° C. After leaving the reaction zone, the vapors cool and some of the tetracyanoethylene formed tends to sublimate onto the tube walls near the bottom of the reactor. This can be removed as a product of variable purity by scraping the reactor after short runs. Such deposition can be prevented by maintaining the tube walls above the sublimation temperature if long runs are to be made. An adapter 40 at the bottom of the tube provides access to the inside of the reactor.

The vapors pass from the bottom of the reactor through tube 42 and into a receiver 44. The receiver is cooled by suitable means to condense the tetracyanoethylene. An ice bath 46 is indicated for cooling the receiver. The carrier gas and unreacted halogen are taken off through tube 48 from the receiver.

The condensate in the receiver contains unchanged malononitrile and halogen-containing by-products. The tetracyanoethylene may be recovered as a substantially pure product by triturating the condensate with cold chlorobenzene to remove some of the soluble impurities and then crystallizing the residue of partially purified tetracyanoethylene from 10–12 parts (by weight) of boiling chlorobenzene. Tetracyanoethylene may be further purified by recrystallization from hot chlorobenzene followed by sublimation at reduced pressure. The purity of the product may be determined by melting point tests, which are made in sealed tubes to prevent sublimation.

The identity of the product as tetracyanoethylene may be established by dissolving some of the product in benzene to obtain a yellow-colored solution characteristic of the tetracyanoethylene-benzene complex. When anthracene is then added, the solution takes on a transient green coloration characteristic of the 1:1 π complex of tetracyanoethylene-anthracene. The disappearance of the color is accompanied by the separation of crystals of the 1:1 Diels-Alder adduct of tetracyanoethylene and anthracene.

In the following examples, which illustrate preferred embodiments of the invention, parts are by weight except where otherwise noted.

Example I

The apparatus described above is employed, approximately ⅙ of the heated reaction zone being packed with 20% calcium oxide on carbon and heated to 320° C. by an electric furnace. Malononitrile and chlorine in 1:2 molecular ratio are introduced into the tube in a stream of nitrogen, the vapor mixture passing through the reaction zone at a space velocity of 425 per hour. The colorless crystals which form along the tube wall near the exit are tested with anthracene-benzene reagent and found to be tetracyanoethylene. The material collected in the receiver is extracted with benzene to obtain the typical yellow-colored 1:1 tetracyanoethylene-benzene complex. This solution gives the usual transient blue-green coloration upon treatment with anthracene, followed by formation of crystals of 1:1 tetracyanoethylene-anthracene adduct.

Example II

Malononitrile and chlorine in 1:1 molar proportions are passed through an unpacked tube heated to 400° C. in a stream of nitrogen at a space velocity of 280 per hour. A total of 150 parts of malononitrile is put through the tube. Some of the lachrymatory oily by-product in the receiver is separated from the crystalline component, partially by decantation and partially by extraction with 110 parts of cold chlorobenzene. The remaining crystals are combined with those scraped from the walls of the tube; the yield is 45 parts. Recrystallization from 120 parts (by weight) of boiling chlorobenzene yields 26 parts (17.3%) of tetracyanoethylene, M. P. 192–195° C. An additional 11 parts of this percyanoolefin may be recovered from the mother liquor, making a total yield of tetracyanoethylene of 23%.

Example III

The apparatus described previously is used, the unpacked column being heated to 450° C. A 1:1.4 molar ratio of malononitrile and chlorine, respectively, is passed through the column at a space velocity of 160 per hour. The accumulation of crystalline solid along the walls near the tube exit necessitates scraping this area several times during the run to maintain an open tube. A total of 80 parts of solid is scraped from the tube during the reaction. The product in the receiver is extracted with three successive 387-part portions of cold chlorobenzene to remove some oily by-products, leaving 60 parts of insoluble solid. This solid is recrystallized from 120 parts of boiling chlorobenzene and yields 41 parts of crude tetracyanoethylene. Ether extraction of this product and the solid from the receiver gives, upon evaporation of the ether, a 24% yield (based on the 310 parts of malononitrile consumed) of purified tetracyanoethylene (M. P. 194–196° C.). Admixture with an authentic sample of tetracyanoethylene does not depress the melting point.

Example IV

Malononitrile and chlorine in 2:3 molar ratio are passed through a tube heated at 450° C. at a space velocity of 240 per hour in a manner similar to that described in the previous examples. Formation of colorless crystals in the receiver and along the walls of the tube begins almost immediately. The reaction is discontinued after 300 parts of malononitrile have been used. The crystals which are collected mechanically from the receiver and from the walls of the tube (180 parts) are recrystallized from 2324 parts of boiling chlorobenzene to which has been added 70 parts of copper powder and 50 parts of carbon. There is obtained 81 parts of tetracyanoethylene as greyish crystals. Further scraping of the tube walls yields 55 parts of black solid, from which is isolated an additional 11 parts of recrystallized tetracyanoethylene. The total amount of recrystallized material corresponds to a 31% yield.

Example V

The apparatus employed is similar to that in the previous examples, except that approximately one-third of the reaction zone is packed with rings of heat-resistant borosilicate glass and the reaction zone is heated to 290° C. Malononitrile (400 parts) and chlorine are introduced in 4:5 molar proportions at a space velocity of 160 per hour. Colorless crystals form along with some oily by-products. The crystalline product which accumulates along the wall of the tube is collected mechanically and recrystallized from 100 parts of boiling chlorobenzene to obtain 60 parts of colored product. The product in the receiver is treated with two successive 775-part portions of cold chlorobenzene to remove most of the oily by-product. The 45 parts of solid which remains is recrystallized from 110 parts of boiling chlorobenzene to yield 32 parts of product. The yield of once recrystallized tetracyanoethylene is 24% (based on the malononitrile consumed).

Sublimation of this product at 150° C. (2 mm.) yields a colorless crystalline solid, M. P. 197–199° C., which gives the typical tetracyanoethylene color tests and does not depress the melting point on admixture with an authentic sample.

Example VI

Malononitrile (200 parts) and bromine are passed separately and simultaneously into a tube in which approximately ¼ of the reaction zone is packed with heat-resistant borosilicate glass rings, and the reaction zone is heated at 350° C. A stream of nitrogen is used to introduce the bromine vapor, the rate being adjusted to deliver 2 molar parts of bromine for 3 molar parts of malononitrile. The space velocity employed is 170 per hour. The contents of the receiver at the exit end of the vapor tube is extracted with 220 parts of benzene. The benzene extract has the typical yellow coloration of the 1:1 benzene-tetracyanoethylene π complex. Treatment of this solution with anthracene gives the characteristic transient green coloration followed by separation of the 1:1 tetracyanoethylene-anthracene Diels-Alder product.

Tetracyanoethylene is also obtained when iodine is substituted for bromine in Example VI.

In carrying out the process of the present invention, the apparatus and space velocities disclosed are not critical but merely illustrate specific ways of insuring that the specified reactants are mixed and brought to the reaction temperature described. Other ways of heating the reactants, such as in a sealed vessel or by heating in tubes in an oven, will be apparent to those skilled in the art.

Prolonged heating at the reaction temperature is not necessary since the reaction to form tetracyanoethylene begins as soon as the reaction temperature is reached. The preferred space velocities of 150–500 per hour represent conditions under which maximum conversions to tetracyanoethylene are obtained with apparatus of the type illustrated, but do not represent limits of operability. Temperatures outside of the 220–500° C. range may also be used. Vapors of malononitrile may be formed at lower temperatures, the limit depending upon the partial pressure desired in the mixture. If the rate of passage of the mixture of reactants through the heated zone is sufficiently rapid and the product vapors are quickly cooled thereafter, it is possible to prepare tetracyanoethylene from malononitrile and a halogen according to the present invention at temperatures in the range 500–1000° C. However, reaction temperatures in this range are generally not preferred because prolonged exposure at these temperatures results in decomposition of part of the tetracyanoethylene which is formed.

Tetracyanoethylene is a valuable intermediate in a variety of syntheses and is useful for conversion to polymers and copolymers with ethylenically unsaturated compounds by heating in the presence of a free radical-producing polymerization catalyst, such as an azonitrile. The high softening characteristics of tetracyanoethylene polymer make it particularly useful as a thermoplastic insulation for coils in electric motors. This insulation permits improved efficiency of operation of the motor by withstanding higher operating temperatures without distortion or displacement of the insulation.

Tetracyanoethylene and its polymers are ready sources of hydrogen cyanide and as such are useful as insecticides. When heated in the presence of moist alkali as in processes adaptable for fumigation, tetracyanoethylene and its polymers generate hydrogen cyanide. When deposited from suspension in an alkaline medium (pH 7 to 9) as by spraying on living plants or in insect nests, tetracyanoethylene and its polymers decompose slowly and give off hydrogen cyanide, thereby serving as effective insect poisons for extended periods of time.

The process of the present invention has a substantial economic advantage over other available methods for preparing tetracyanoethylene. The starting materials are readily available and inexpensive. The process is suitable for continuous plant operation, and uses easily constructed equipment. Reaction in the vapor phase greatly simplifies material handling and control of the reaction. The product is readily recovered from the vapor stream as a crude solid which is easily purified.

Since many different embodiments of the invention may be made without departing from the spirit and scope thereof, it is to be understood that the invention is not limited by the specific illustrations, except to the extent defined in the following claims.

What is claimed is:

1. A process for preparing tetracyanoethylene which comprises reacting in the vapor phase malononitrile with a halogen of atomic weight above 30.

2. A process for preparing tetracyanoethylene which comprises mixing vapors of malononitrile with vapors of a halogen of atomic weight above 30, maintaining the mixture at a temperature of about 220–500° C. until a vapor phase reaction has occurred, and separating the tetracyanoethylene formed from the reaction mixture.

3. A process for preparing tetracyanoethylene which comprises mixing vapors of malononitrile and a halogen of atomic weight above 30, passing the vapor mixture through a heated zone at a temperature of about 220–500° C., thereafter cooling the vapors to condense the tetracyanoethylene formed, and isolating the tetracyanoethylene.

4. A process as defined in claim 3 in which the halogen is chlorine.

5. A process as defined in claim 3 in which the vapor mixture is passed through the heated zone at a space velocity of 150–500 per hour.

6. A process as defined in claim 3 in which the vapor mixture is passed through the heated zone at a temperature of 250–350° C. and a space velocity of 150–500 per hour.

7. A process as defined in claim 3 in which the tetracyanoethylene is isolated by extraction of the condensate and recrystallization of tetracyanoethylene from solution.

8. A process for preparing tetracyanoethylene which comprises passing mixed vapors of malononitrile and a halogen of atomic weight above 30 at a space velocity of 150–500 per hour through a heated reaction zone maintained at 250–500° C., thereafter passing the vapors through a received, cooling the receiver to condense the tetracyanoethylene formed, and recovering the tetracyanoethylene from the condensate.

9. A process as defined in claim 8 in which the reaction zone is a tubular chamber containing an inert packing.

References Cited in the file of this patent
UNITED STATES PATENTS

| | | |
|---|---|---|
| 2,697,711 | Arnold | Dec. 21, 1954 |
| 2,697,712 | Arnold | Dec. 21, 1954 |